(12) United States Patent
Volek et al.

(10) Patent No.: US 10,852,797 B2
(45) Date of Patent: *Dec. 1, 2020

(54) COMPUTER DOCKING STATION

(71) Applicant: Humanscale Corporation, New York, NY (US)

(72) Inventors: Robert Volek, Brooklyn, NY (US); Steve Bender, Fairfield, CT (US)

(73) Assignee: Humanscale Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/720,762

(22) Filed: Sep. 29, 2017

(65) Prior Publication Data
US 2018/0024607 A1 Jan. 25, 2018

Related U.S. Application Data

(63) Continuation of application No. 15/179,705, filed on Jun. 10, 2016, now Pat. No. 9,804,652.

(60) Provisional application No. 62/212,828, filed on Sep. 1, 2015.

(51) Int. Cl.
| | | |
|---|---|---|
| *G06F 1/26* | (2006.01) | |
| *G06F 1/16* | (2006.01) | |
| *H02J 7/00* | (2006.01) | |

(52) U.S. Cl.
CPC ............ *G06F 1/266* (2013.01); *G06F 1/1601* (2013.01); *G06F 1/1632* (2013.01); *H02J 7/00* (2013.01); *H02J 7/0042* (2013.01)

(58) Field of Classification Search
None
See application file for complete search history.

(56) References Cited

U.S. PATENT DOCUMENTS

| | | | |
|---|---|---|---|
| 5,497,214 A | 3/1996 | Labree | |
| 5,924,892 A | 7/1999 | Ferracina | |
| D413,571 S | 9/1999 | Glass | |
| 6,004,157 A | 12/1999 | Glass | |
| 6,134,612 A | 10/2000 | Bailey et al. | |
| 6,256,193 B1 * | 7/2001 | Janik | A47B 23/043 |
| | | | 248/922 |
| 6,476,884 B1 | 11/2002 | Shao | |

(Continued)

FOREIGN PATENT DOCUMENTS

WO 2015161695 10/2015

OTHER PUBLICATIONS

PCT/US2016/037107, Search Report and Written Opinion, ISA/US, dated Sep. 2, 2016.

*Primary Examiner* — Xanthia C Cunningham
(74) *Attorney, Agent, or Firm* — Jones Walker LLP

(57) ABSTRACT

A computer docking station devised to save desktop space while also eliminating the presence of permanent cables that can clutter the work surface is disclosed. The computer docking station utilizes a split design, with a lower dock subassembly positioned beneath the work surface for housing the permanent cables necessary for the computer workstation to operate and an upper dock subassembly comprising one or more data ports positioned on top of the work surface. A monitor arm mount can be attached to, or integrated into, the upper dock subassembly, thereby alleviating the need for a separate monitor arm mount without negatively impacting the docking station's footprint.

28 Claims, 19 Drawing Sheets

(56) References Cited

U.S. PATENT DOCUMENTS

| | | |
|---|---|---|
| 6,519,143 B1 | 2/2003 | Goko |
| 6,540,554 B2 | 4/2003 | McCarthy |
| 6,589,073 B2 | 7/2003 | Lee |
| 6,987,666 B2 | 1/2006 | Medica et al. |
| D515,033 S | 2/2006 | Petrick et al. |
| 7,061,754 B2 | 6/2006 | Moscovitch |
| 7,215,538 B1 | 5/2007 | Chen et al. |
| 8,842,427 B2 | 9/2014 | Yoshimura et al. |
| 9,148,006 B2 | 9/2015 | Byrne et al. |
| 9,153,112 B1 | 10/2015 | Kiani et al. |
| 9,161,464 B2 | 10/2015 | Liao |
| 9,565,930 B2 | 2/2017 | Gwag |
| 2003/0086240 A1 | 5/2003 | Jobs et al. |
| 2003/0122973 A1 | 7/2003 | Huang |
| 2005/0079769 A1 | 4/2005 | Strayer |
| 2005/0170687 A1 | 8/2005 | Goh |
| 2007/0088875 A1 | 4/2007 | Martin et al. |
| 2007/0139870 A1 | 6/2007 | Lin |
| 2007/0275594 A1 | 11/2007 | Greenberg |
| 2009/0154079 A1* | 6/2009 | Bae .................. A47B 21/00 361/679.02 |
| 2010/0323559 A1 | 12/2010 | Chambers |
| 2011/0108698 A1 | 5/2011 | Chen |
| 2011/0287665 A1 | 11/2011 | Chien |
| 2011/0303805 A1 | 12/2011 | Lau et al. |
| 2012/0117467 A1* | 5/2012 | Maloney ............. G06Q 10/00 715/273 |
| 2013/0033807 A1* | 2/2013 | Kim .................. G06F 1/1632 361/679.01 |
| 2013/0071176 A1 | 3/2013 | Chen et al. |
| 2014/0367137 A1 | 12/2014 | Leung |
| 2015/0192971 A1* | 7/2015 | Shah ................. G06F 1/203 361/679.41 |
| 2015/0286252 A1* | 10/2015 | Barone ............. G07G 1/0018 710/304 |
| 2016/0294113 A1* | 10/2016 | Mehandjiysky ...... G06F 1/1632 |
| 2018/0217636 A1* | 8/2018 | McNamara ........... H01R 35/04 |

* cited by examiner

COMPUTER DOCKING STATION

CROSS-REFERENCE TO RELATED APPLICATIONS

This application is a continuation of U.S. application Ser. No. 15/179,705, filed Jun. 10, 2016, which claims the benefit of U.S. Provisional Application No. 62/212,828, filed Sep. 1, 2015, both of which are incorporated by reference herein in their entirety.

BACKGROUND

Advances in processors, battery life, and visual displays have vastly improved the performance possibilities of laptop computers. With wireless mobility and connectivity becoming a necessity in today's business environment, many businesses and entrepreneurs have chosen to use laptop computers in lieu of desktops in the workplace. However, laptops typically have smaller keyboards than the standard keyboards utilized with desktops, and a standard mouse is generally preferred by users in the office environment over the built-in touchpad or trackpad of laptop computers. In addition, prolonged use of a laptop alone can be an uncomfortable experience for the user.

A docking station allows laptop computers to become a substitute for a desktop computer without sacrificing the mobile computing functionality of the machine. For example, port replicator-type docking stations allow multiple peripherals—such as a keyboard, a printer, a mouse, and/or one or more monitors—to be connected to the laptop simultaneously by simply connecting the laptop to the docking station. Thus, the user can get access to an external full-sized keyboard, standard mouse, full-size monitor(s), a printer/scanner and a wired network connection when working in the office environment. Ergonomic positioning of the external keyboard and monitor allow the user to assume a more comfortable, neutral posture at the workstation, thus reducing the musculoskeletal stress typically associated with the prolonged use of laptop computers.

In a typical office configuration, the docking station will be located on the work surface to allow the user to easily connect the laptop to the dock. However, while this location provides the convenience of a quick and easy connection to the laptop, the docking station can take up valuable workspace, regardless of whether a vertical stand-alone docking station or a horizontal style docking station is utilized. Moreover, current generation docking stations positioned on the work surface leave the permanent cables exposed on the work surface, creating a cluttered work environment.

SUMMARY

The invention disclosed herein is directed to a computer docking station devised to save desktop space while also eliminating the presence of permanent cables that can clutter the work surface. Whereas prior art computer docking stations typically are unitary units that take up valuable space on the work surface, the computer docking station of the present invention significantly reduces the docking station's desktop footprint by utilizing a split design, with a lower dock subassembly positioned beneath the work surface for housing the permanent cables necessary for the computer workstation to operate, and an upper dock subassembly comprising one or more data ports positioned on top of the work surface. In certain embodiments, a monitor arm mount can also be integrated into the upper dock subassembly, thereby alleviating the need for a separate monitor arm mount without negatively impacting the docking station's footprint. The split-design computer docking station of the present invention provides for improved accessibility to commonly used ports such as universal serial bus (USB) ports, high-speed charging port(s) and audio/microphone ports, while eliminating unsightly permanent cables (e.g., power, video, and network cables) from the desktop, which not only improves aesthetics and the amount of available desk space, but also eliminates the safety hazard of having cables on the work surface and prevents users from intentionally or unintentionally tampering with permanent cables.

The above summary is not intended to describe each illustrated embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages in accordance with the present invention.

DETAILED DESCRIPTION

Figure 1:
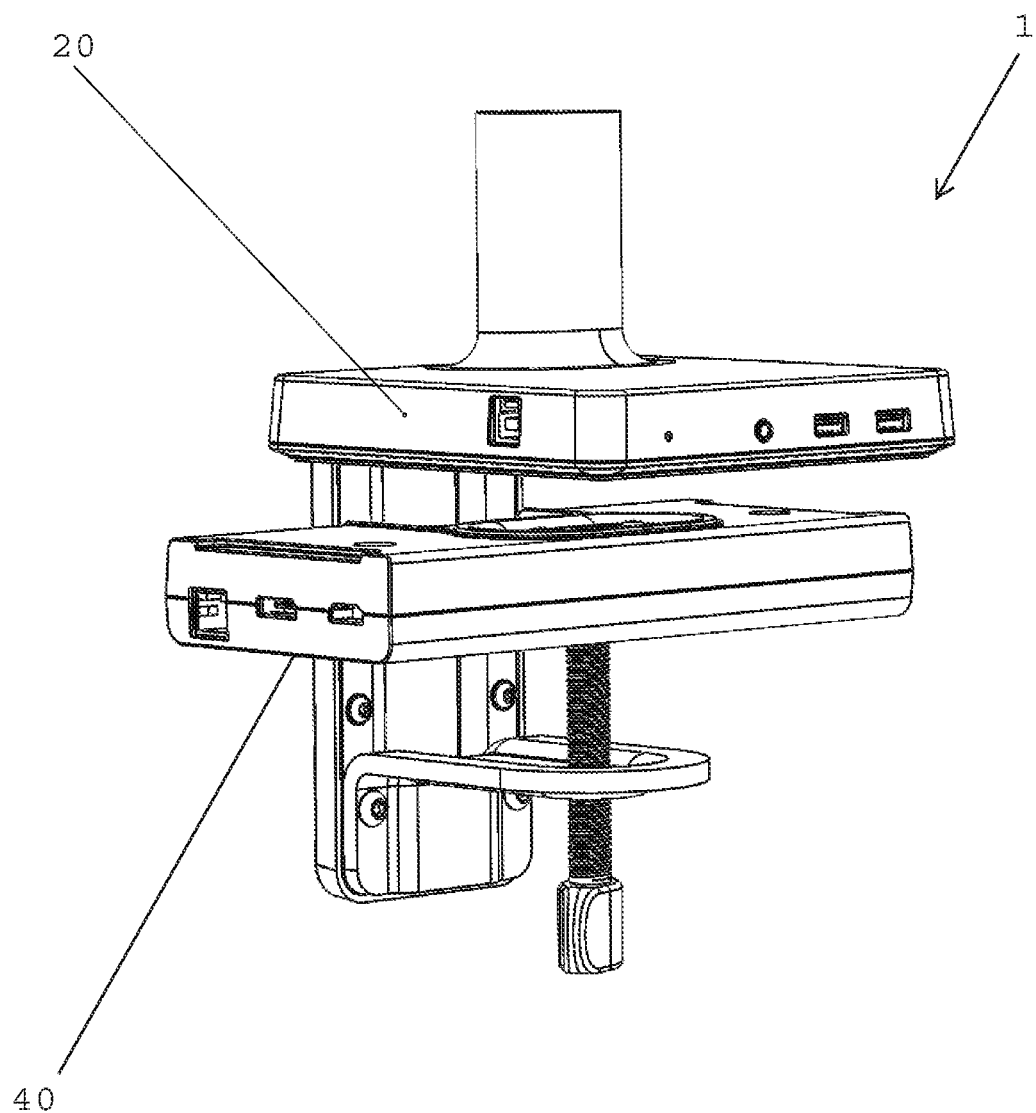
FIG. 1 is a front perspective view of an embodiment of a computer docking station.
Figure 2:
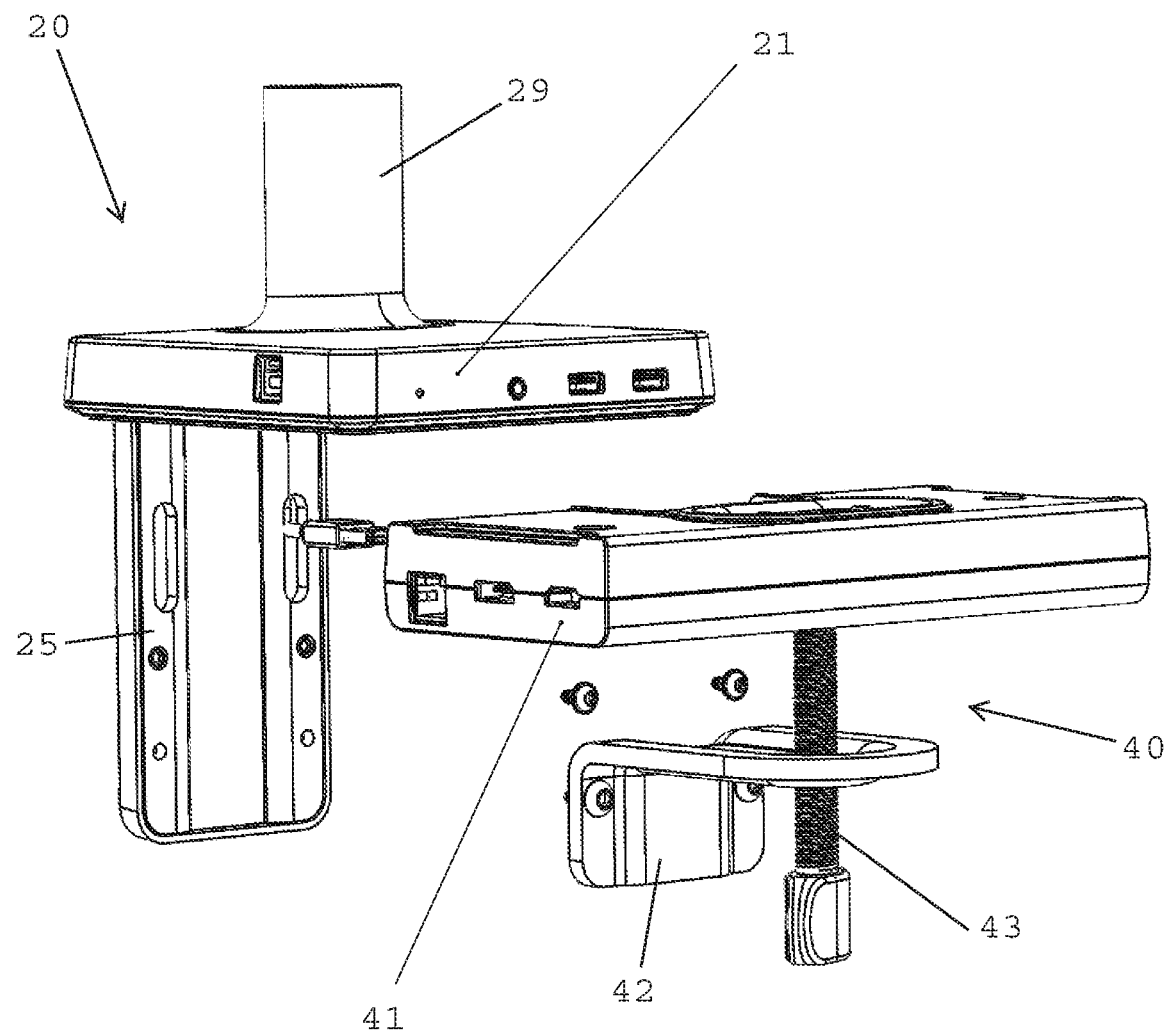
FIG. 2 is a partially exploded view of the embodiment of the computer docking station shown in FIG. 1.
Figure 3:
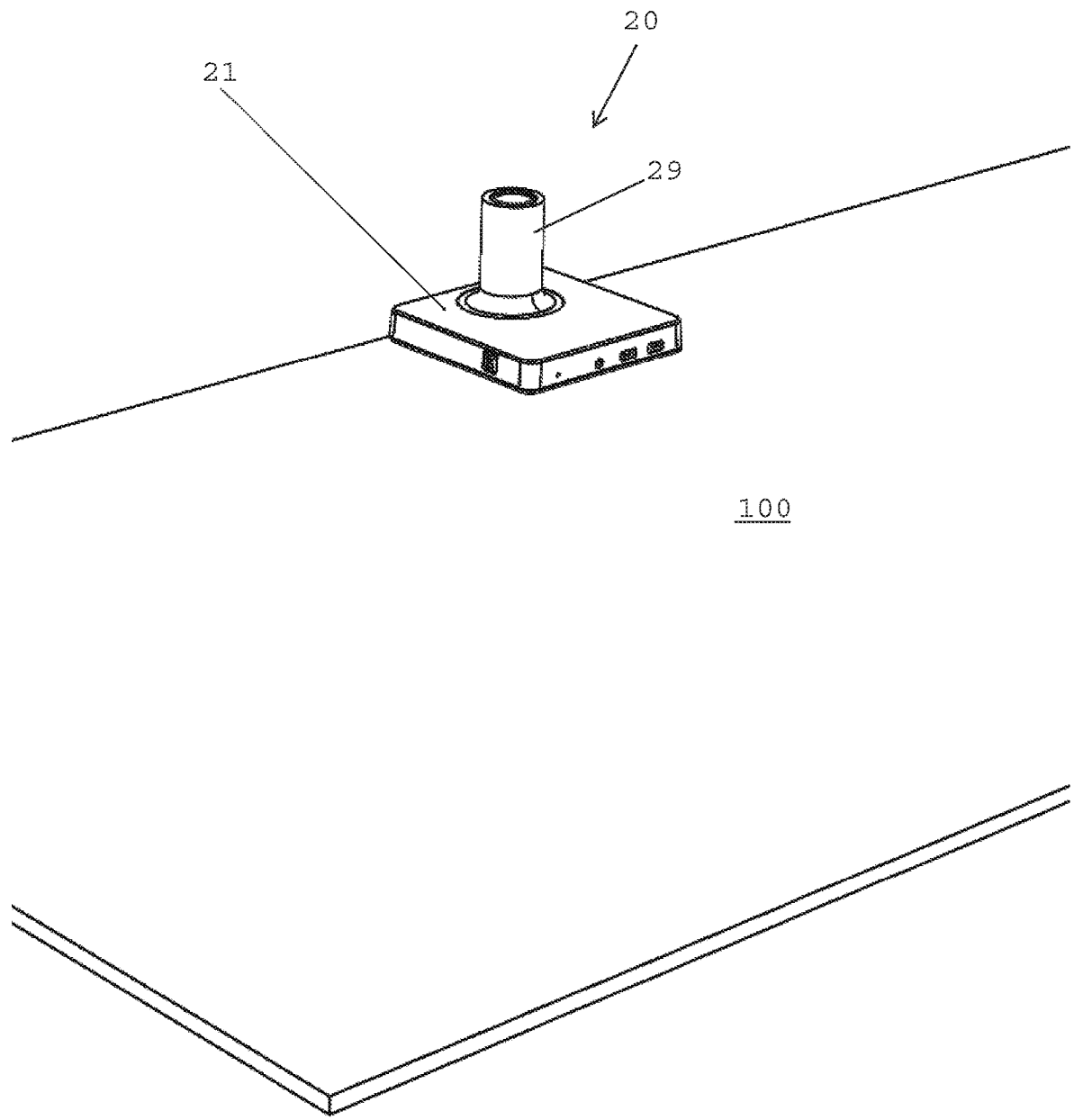
FIG. 3 is a front perspective view of the embodiment of the computer docking station shown in FIG. 1 wherein the computer docking station is mounted to a table.
Figure 4:
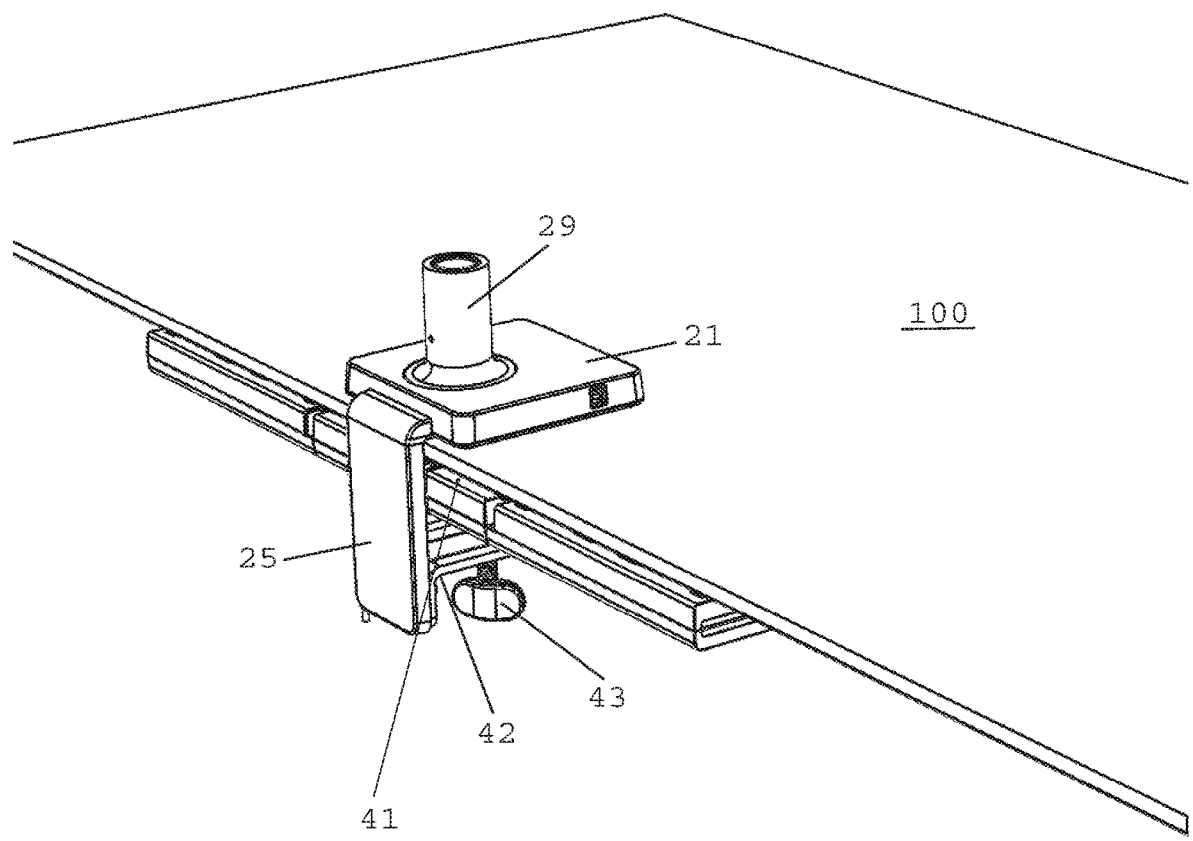
FIG. 4 is a rear perspective view of the embodiment of the computer docking station shown in FIG. 1 wherein the computer docking station is mounted to a table.
Figure 5:
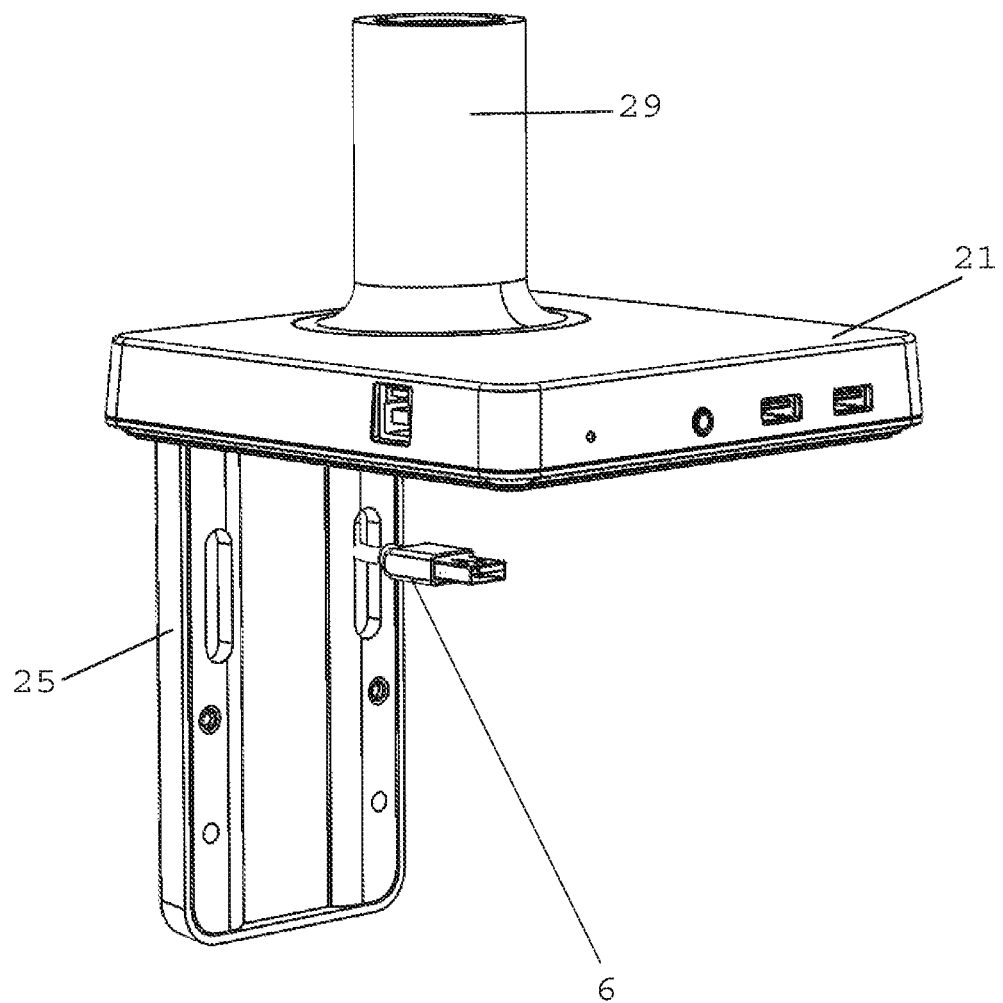
FIG. 5 is a front perspective view of an embodiment of the upper dock subassembly of the computer docking station shown in FIG. 1.
Figure 6:
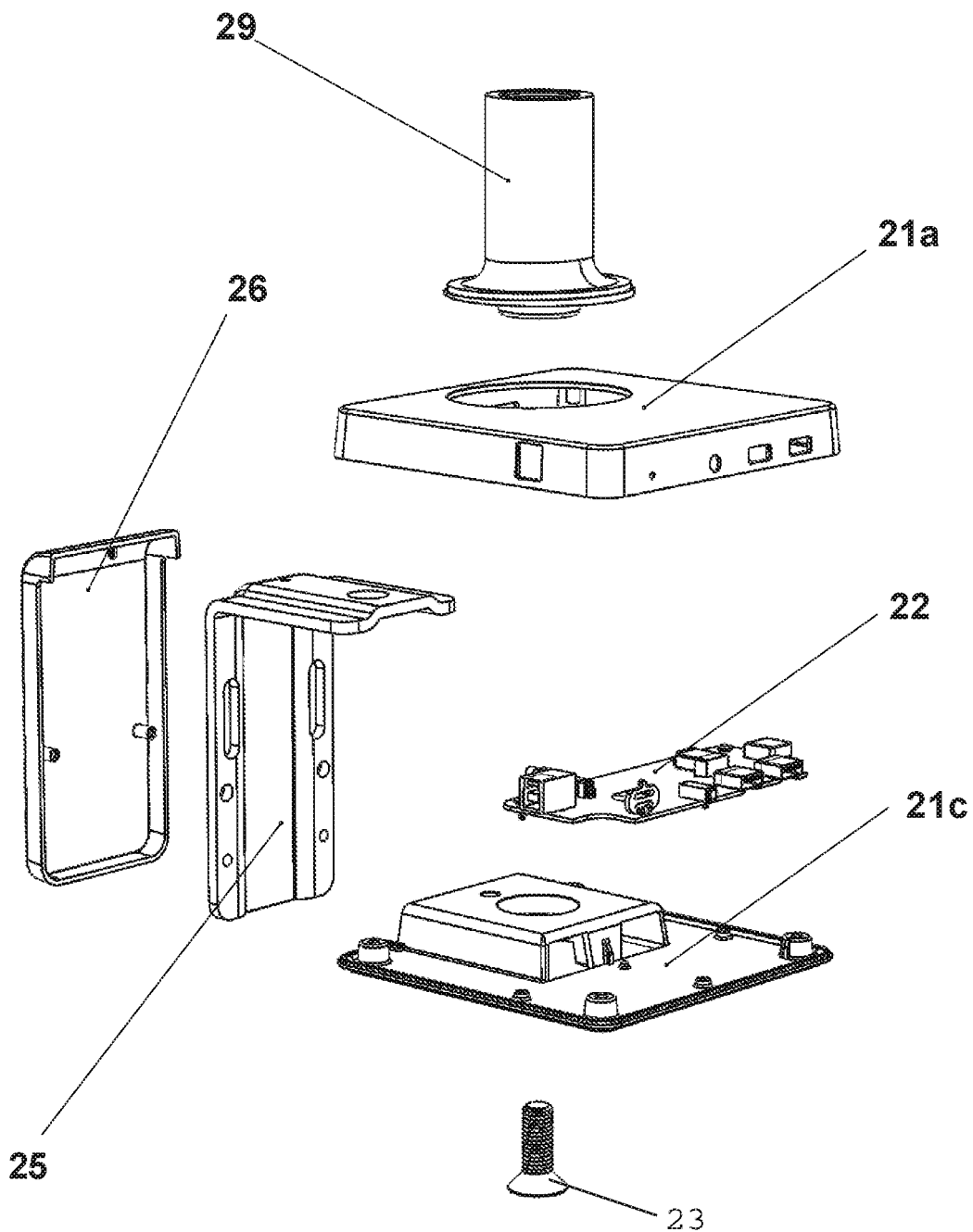
FIG. 6 is an exploded view of an embodiment of the upper dock subassembly of the computer docking station shown in FIG. 1.
Figure 7:
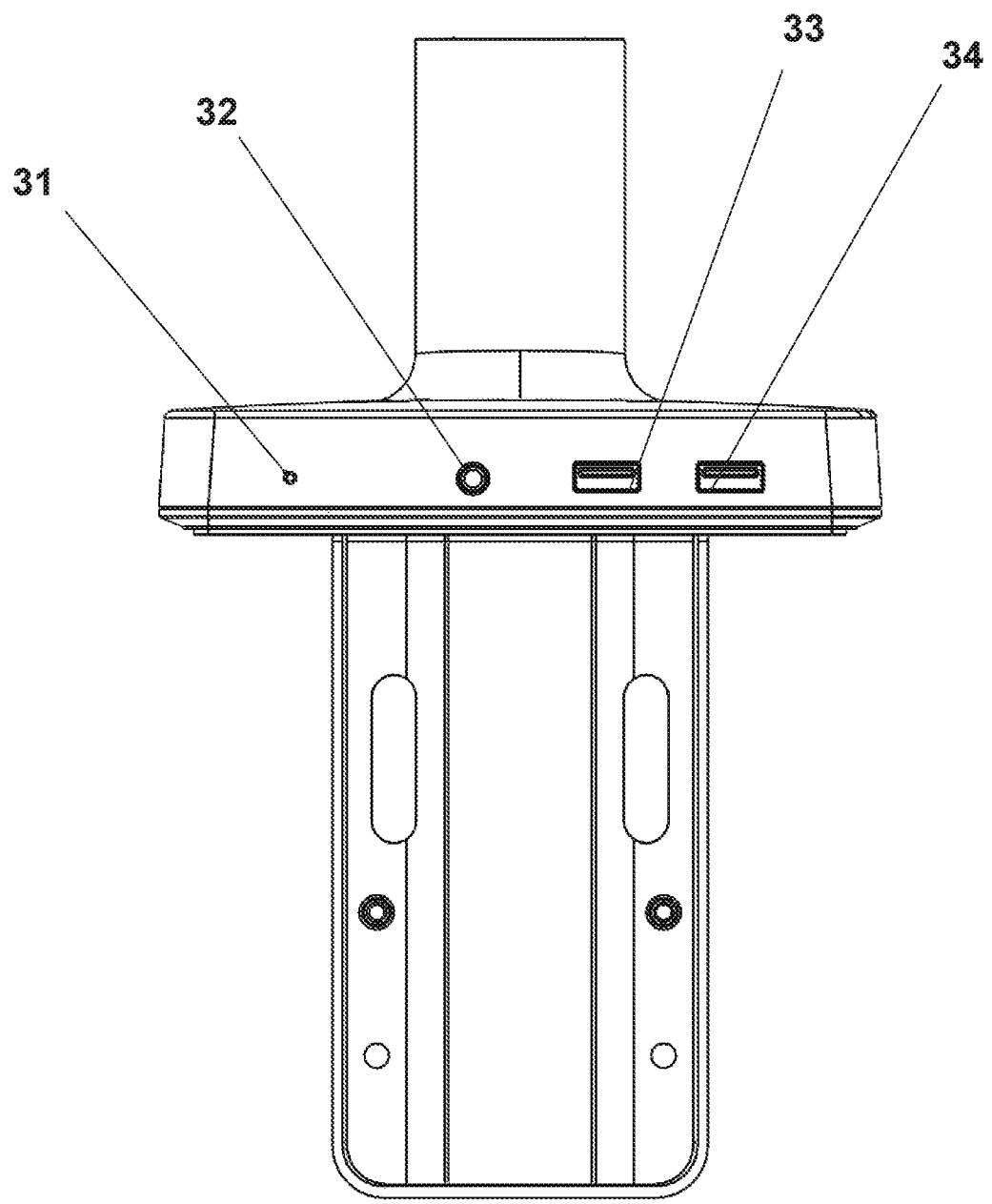
FIG. 7 is a front view of an embodiment of the upper dock subassembly of the computer docking station shown in FIG. 1.
Figure 8:
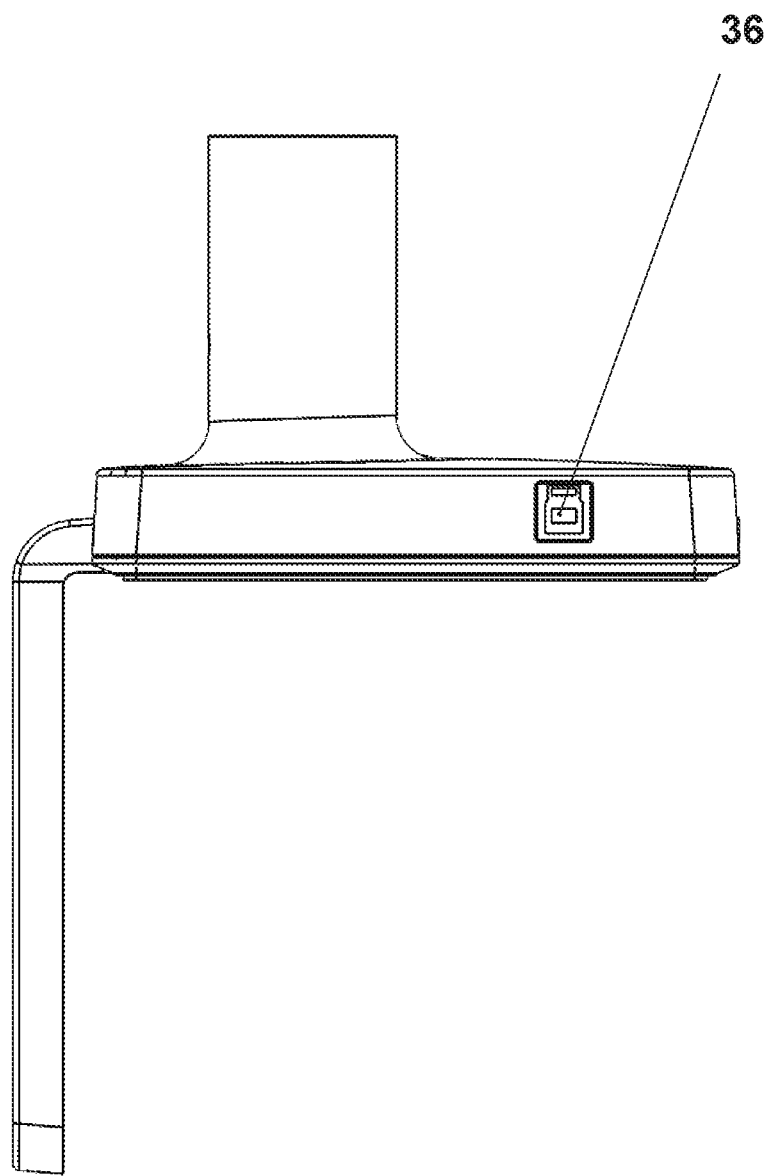
FIG. 8 is a left side view of an embodiment of the upper dock subassembly of the computer docking station shown in FIG. 1.
Figure 9:
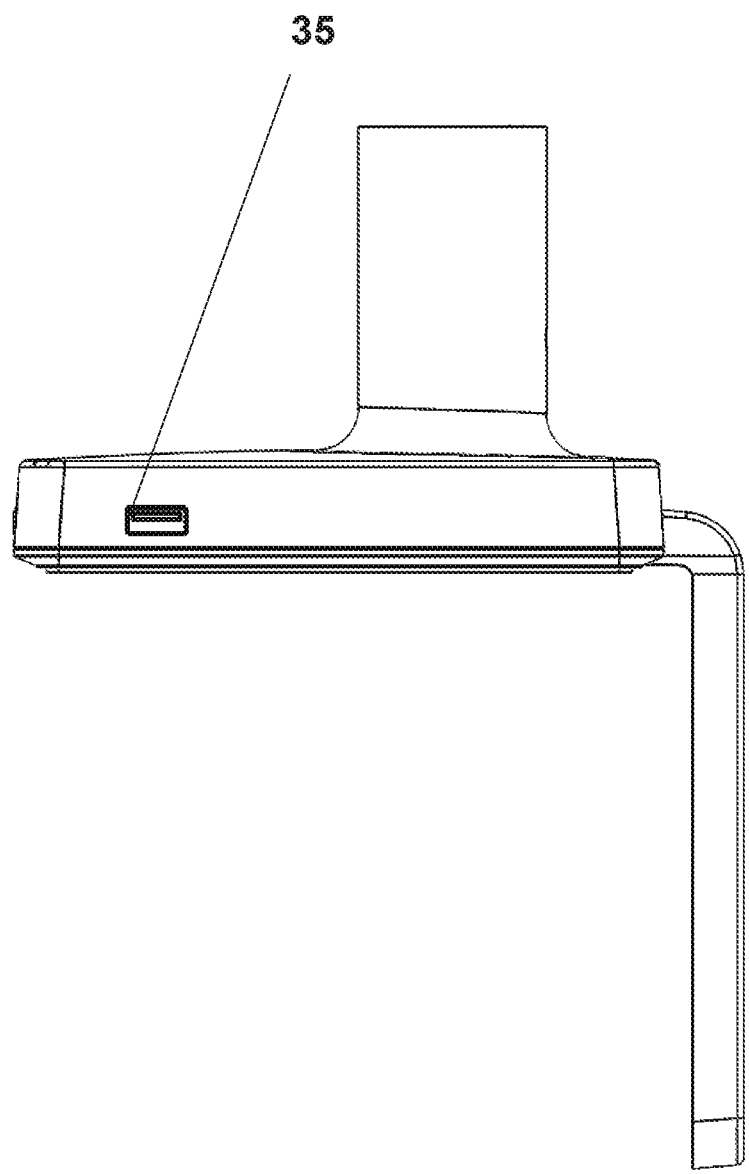
FIG. 9 is a right side view of an embodiment of the upper dock subassembly of the computer docking station shown in FIG. 1.
Figure 10:
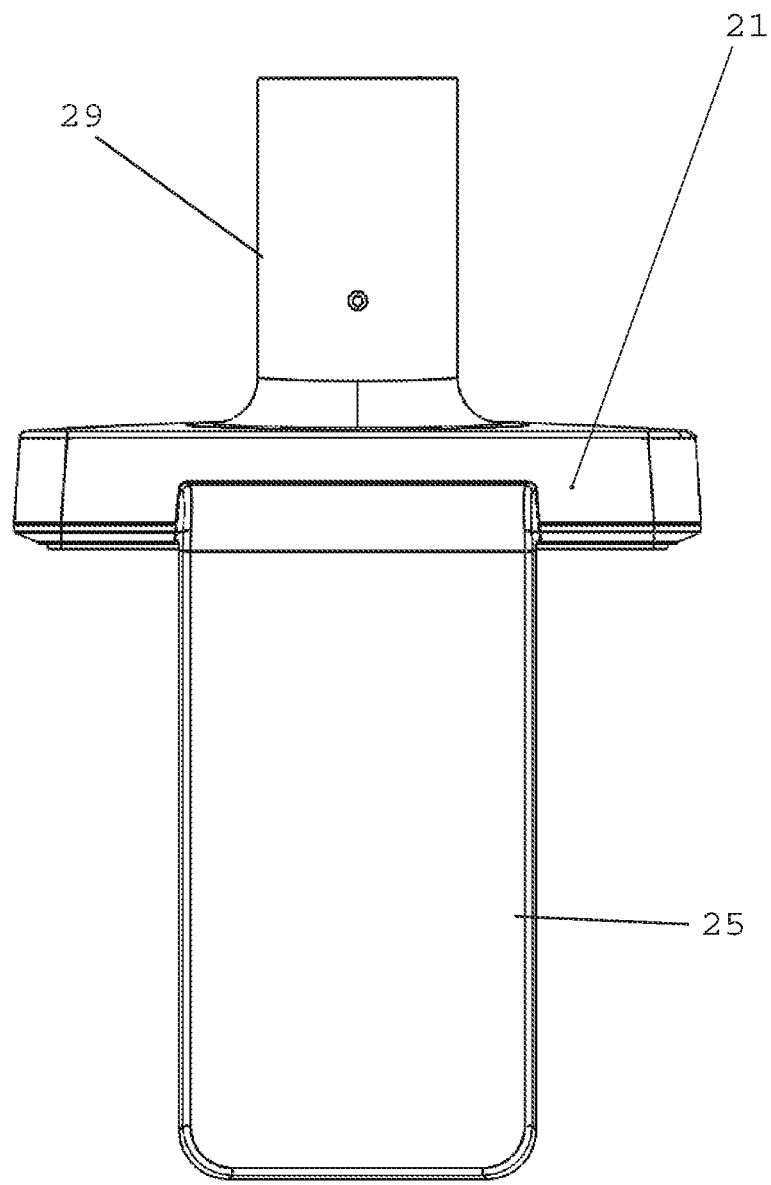
FIG. 10 is a rear view of an embodiment of the upper dock subassembly of the computer docking station shown in FIG. 1.
Figure 11:
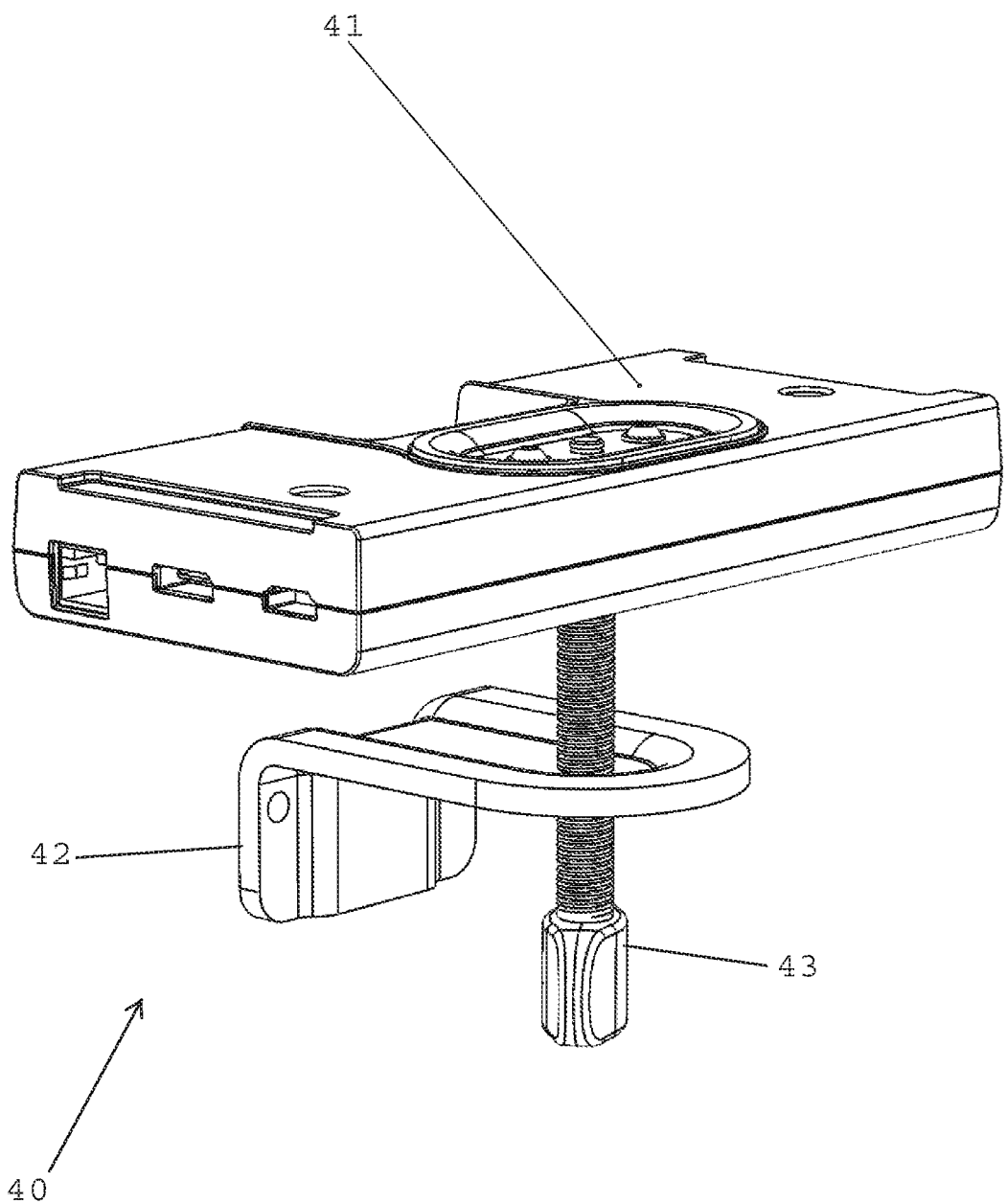
FIG. 11 is a front perspective view of an embodiment of the lower dock subassembly of the computer docking station shown in FIG. 1.
Figure 12:
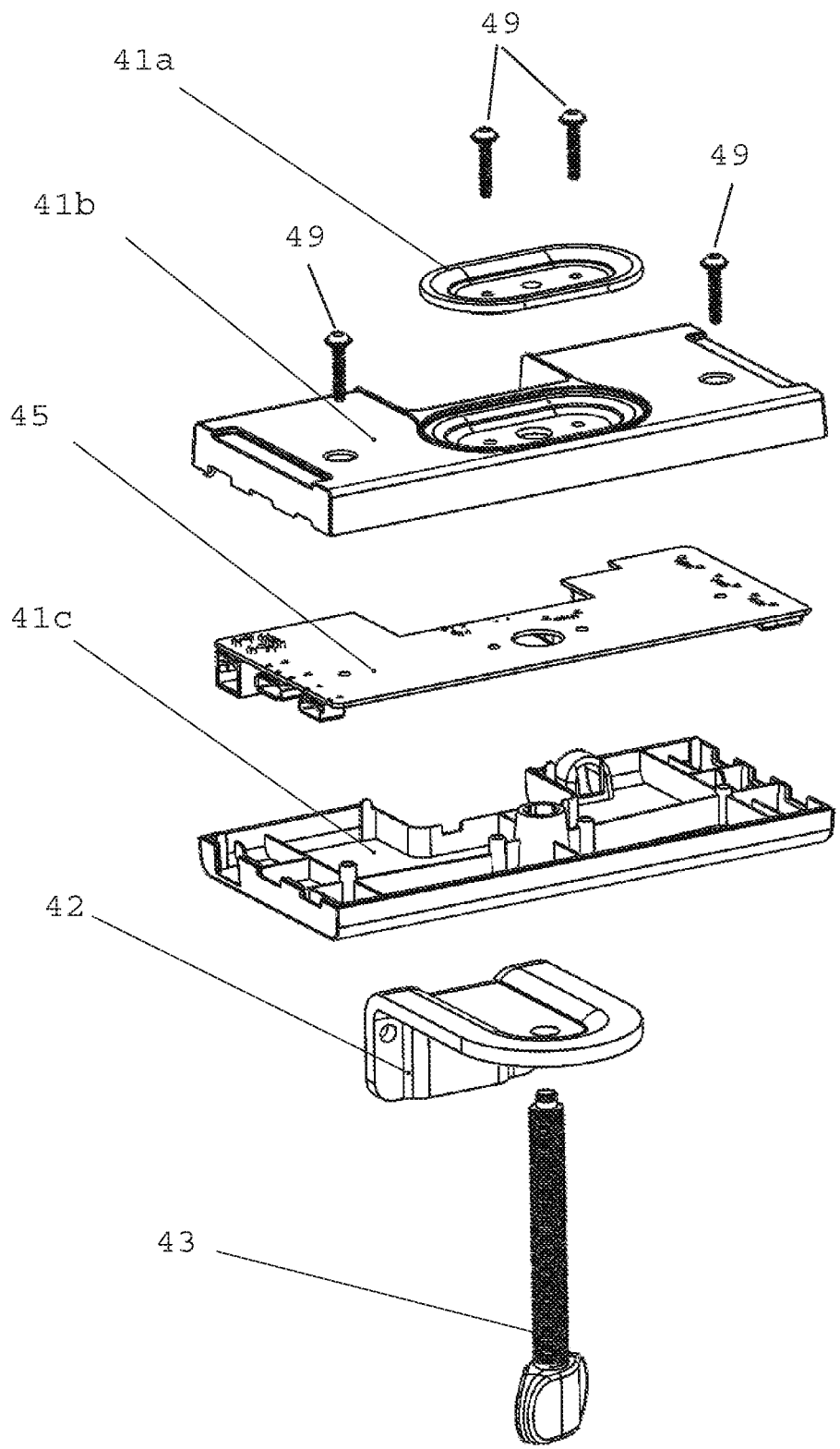
FIG. 12 is an exploded view of an embodiment of the lower dock subassembly of the computer docking station shown in FIG. 1.
Figure 13:
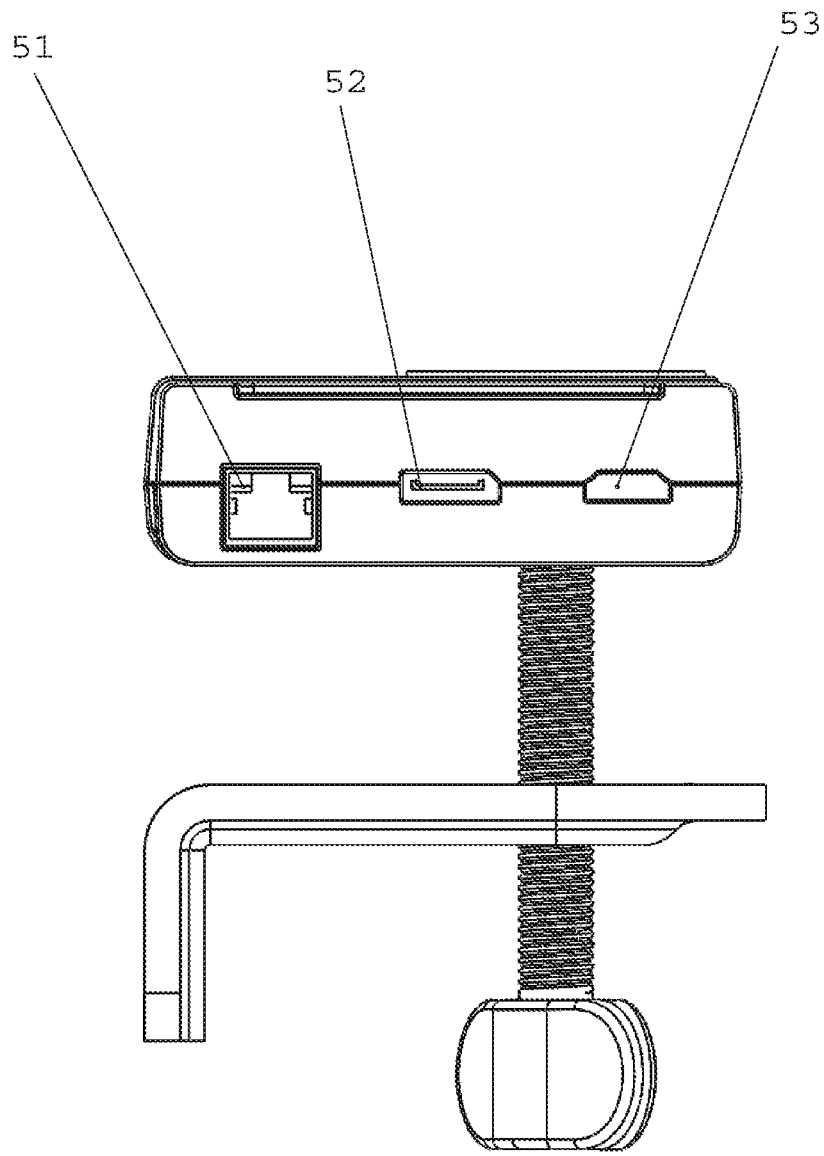
FIG. 13 is a left side view of an embodiment of the lower dock subassembly of the computer docking station shown in FIG. 1.
Figure 14:
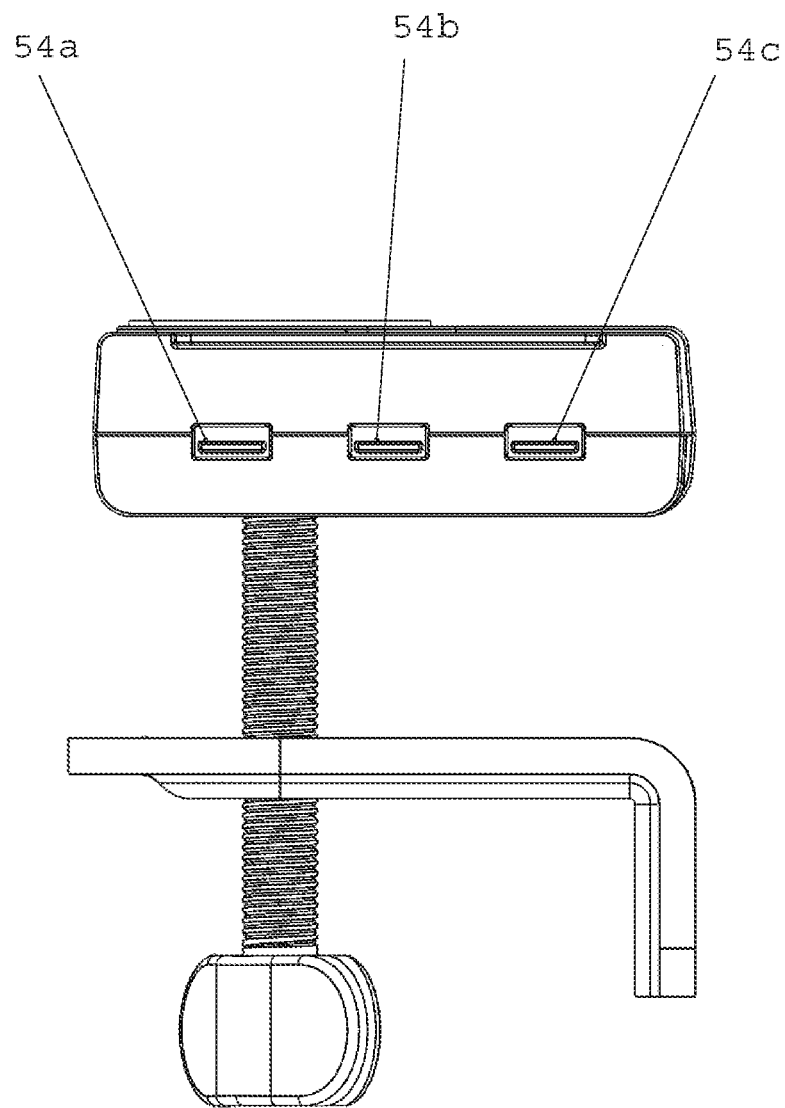
FIG. 14 is a right side view of an embodiment of the lower dock subassembly of the computer docking station shown in FIG. 1.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more than one. The term "plurality," as used herein, is defined as two or more than two. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, top and bottom, right and left, and the like may be used solely to distinguish one entity or action from another entity or action without necessarily requiring or implying any actual such relationship or order between such entities or actions.

Described now are exemplary embodiments of the present invention. An exemplary embodiment of the computer docking station is depicted in FIGS. 1-19. Referring to FIGS. 1-5, the computer docking station 1 can comprise an upper dock subassembly 20 connected to a lower dock subassembly 40. The upper dock subassembly 20 is designed to house active data port connectors (i.e., frequently connected/disconnected), while the lower dock subassembly 40 is designed to house passive data port connectors (i.e., infrequently connected/disconnected). The upper dock subassembly 20 can include a data port hub 21, a monitor arm mount 29, and a bracket 25. The monitor arm mount 29 is preferably attached or integrated into the top of the data port hub 21, while the bracket 25 is preferably attached to the rear or bottom of the data port hub 21. The lower dock subassembly 40 can include a housing 41, a clamp bracket 42, and a screw 43. The housing 41 and clamp bracket 42 can be attached to the bracket 25 of the upper dock subassembly 20 with one or more fasteners. Meanwhile, the screw 43 is threadingly engaged with the clamp bracket 42. In order to secure the computer docking station 1 to a work surface or table 100, the user can rotate the screw 43 until the screw's distal end comes into contact with the underside of the work surface 100. In a preferred embodiment, the housing 41 of the lower dock subassembly 40 is attached to the bracket 25 of the upper dock subassembly 20 with a sufficient space in-between to accommodate a work surface 100 of varying thicknesses.

A variety of alternative mechanisms can be utilized to mount the lower dock subassembly 40 and the upper dock subassembly 20 to the work surface. For example, in a first alternative embodiment, the clamp bracket 42 and screw 43 can be replaced with a fixed bracket that permanently attaches the computer docking station 1 to the work surface. In a second alternative embodiment, the clamp bracket 42 and screw 43 can be replaced with a means for removably mounting the computer docking station 1 to a slat wall. In a third alternative embodiment, the computer docking station 1 can utilize separate brackets to mount the lower dock subassembly 40 and the upper dock subassembly 20 to the work surface, thereby allowing for greater flexibility in mounting locations for each subassembly. In a fourth alternative embodiment, the upper dock subassembly 20 can be secured to the work surface, while the lower dock subassembly 40 is free hanging from a flexible connector to the upper dock subassembly 20, thereby allowing the user to quickly adjust the positioning of the lower dock subassembly 40 relative to the upper dock subassembly 20. While FIGS. 1-19 depict the upper and lower dock subassemblies 20,40 positioned in a horizontal orientation, one skilled in the art will readily appreciate that either or both of the dock subassemblies 20,40 can alternatively be positioned in a vertical orientation.

The active data port connectors of the upper dock subassembly 20 can be linked to the internal components of the lower dock subassembly 40 via one or more bridge cables 6. In a preferred embodiment, a single bridge cable 6 is utilized to connect the active data port connectors of the upper dock subassembly 20 to the internal components of the lower dock subassembly 40. In alternative embodiments, multiple bridge cables 6 can be utilized to link the various data ports, or the bridge cable(s) 6 can be replaced with wireless connection.

Referring now to FIGS. 6-10, the upper dock subassembly 20 can feature a data port hub 21, a monitor arm mount 29, a bracket 25, and one or more data ports 32-36. The data port hub 21 can comprise a hub cover 21a attached to a hub base 21c for housing an upper subassembly printed circuit board assembly (PCBA) 22, while also providing sufficient rigidity to support the weight of one or more monitors attached to the upper dock subassembly 20. The hub cover 21a the hub base 21c, the bracket 25, and the monitor arm mount 29 can be connected with one or more fasteners 23, can be molded with snap-fit joints, or can be attached by any other means known in the art. In certain embodiments, a bracket cover 26 can be utilized to secure and hide the one or more bridge cables 6 linking the active data port connectors of the upper dock subassembly 20 to the internal components of the lower dock subassembly 40.

In the exemplary embodiment depicted in FIGS. 7-10, the upper subassembly PCBA 22 can feature an indicator light 31 and one or more data ports 32-36. The indicator light 31 functions to provide the user feedback regarding the operation status of the computer docking station 1. Data port 32 can be an audio combo jack port, while data ports 33, 34 and 35 preferably are USB-A 3.0 SS (SuperSpeed, 0.9 A) data ports which allow users to connect USB peripherals and mobile devices to the user's laptop via the computer docking station 1. In an exemplary embodiment, data port 33 is a USB 3.0 BC 1.2 (1.5 A) charging port, while data ports 34 and 35 are USB-C ports capable to be used for both connectivity and power. Data port 36 can comprise a USB 3.0 B-Type upstream connector port designed to be linked to the user's laptop. The USB 3.0 B-Type upstream connector port 36 allows for the transfer of data, video and audio information between the computer and peripherals through the computer docking station 1, as well as the transfer of power when USB C-Type connector cables are utilized. In alternative embodiments, one skilled in the art will readily acknowledge that the locations and types of data ports 32-36 can easily be modified to adapt to changing technologies and uses of the data ports. For example, the back of the data port hub can be used to accommodate one or more of the data ports 32-36. In certain embodiments the upper subassembly PCBA 22 can also feature a wireless charging platform for mobile devices.

Referring now to FIGS. 11-16, the housing 41 of the lower dock subassembly 40 can comprise a clamp foot 41a, a top member 41b and a bottom member 41c. The clamp foot 41a is attached to the top member 41b, while the top member 41b is attached to the bottom member 41c to provide a housing for the lower subassembly PCBA 45. The clamp foot 41a, the top member 41b and the bottom member 41c can be connected with one or more fasteners 49, can be molded with snap-fit joints, or can be attached by any other means known in the art.

In the exemplary embodiment depicted in FIGS. 7-10, the lower subassembly PCBA 45 features one or more power and data ports 51-58. Data port 51 can comprise a RJ45 100 Mbit Ethernet connector for providing the user's laptop with a wired internet connection through the computer docking station 1. Data port 52 can comprise a Display Port connector and data port 53 can comprise an HDMI connector for allowing monitor(s) to be connected to the computer docking station 1. Alternatively, these data port could be a DVI, HDMI or USB-C type connectors/ports. Data ports 54a-c can be USB-A 3.0 SS (SuperSpeed, 0.9 A) data ports which allow users to connect USB peripherals to the user's laptop via the computer docking station 1. In alternative embodiments, data ports 54a-c can be any type of USB port, including but not limited to USB 3.0 BC 1.2 (1.5 A) charging ports and USB-C ports.

Figure 15:
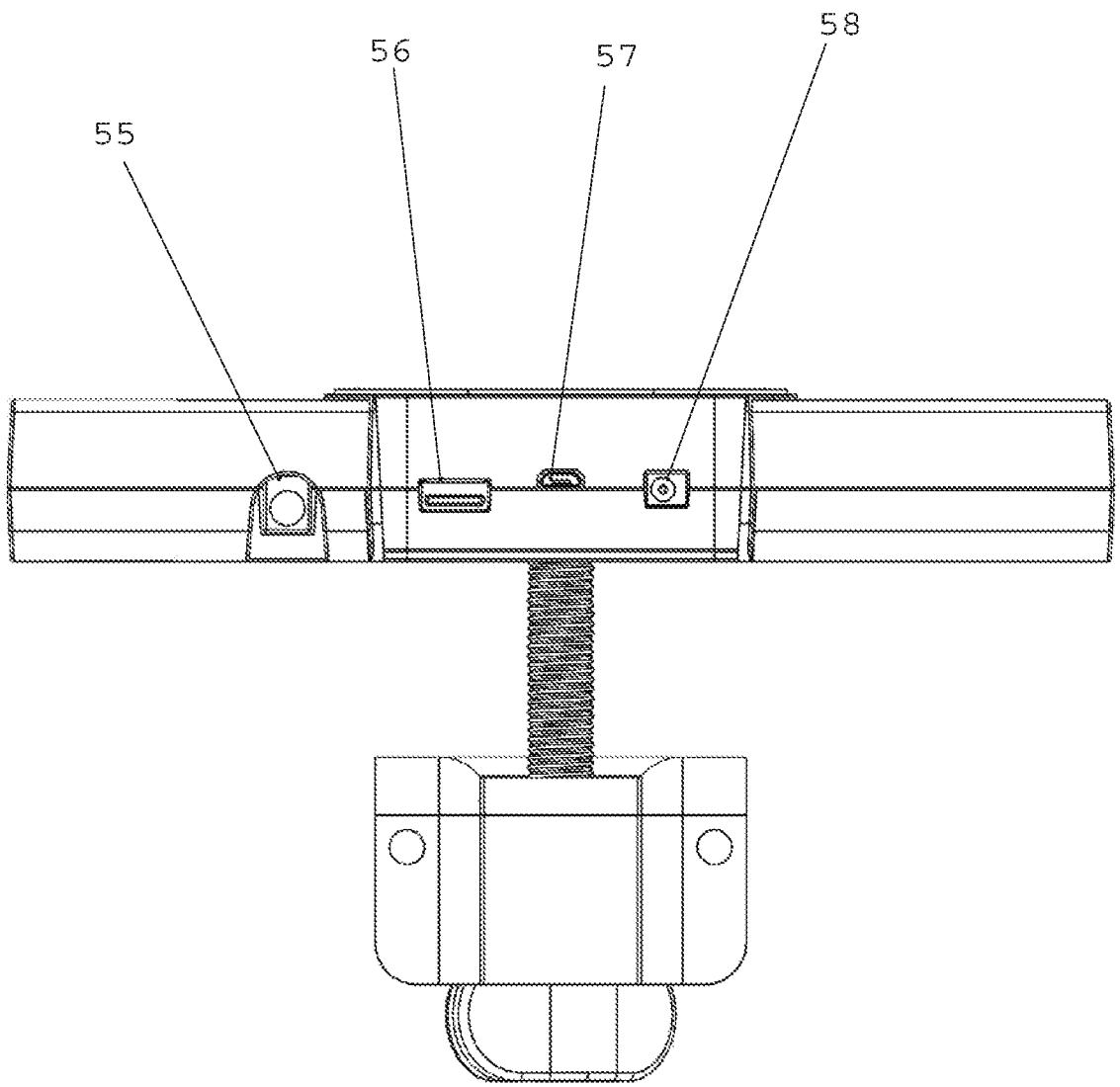
FIG. 15 is a rear view of an embodiment of the lower dock subassembly of the computer docking station shown in FIG. 1.
Figure 16:
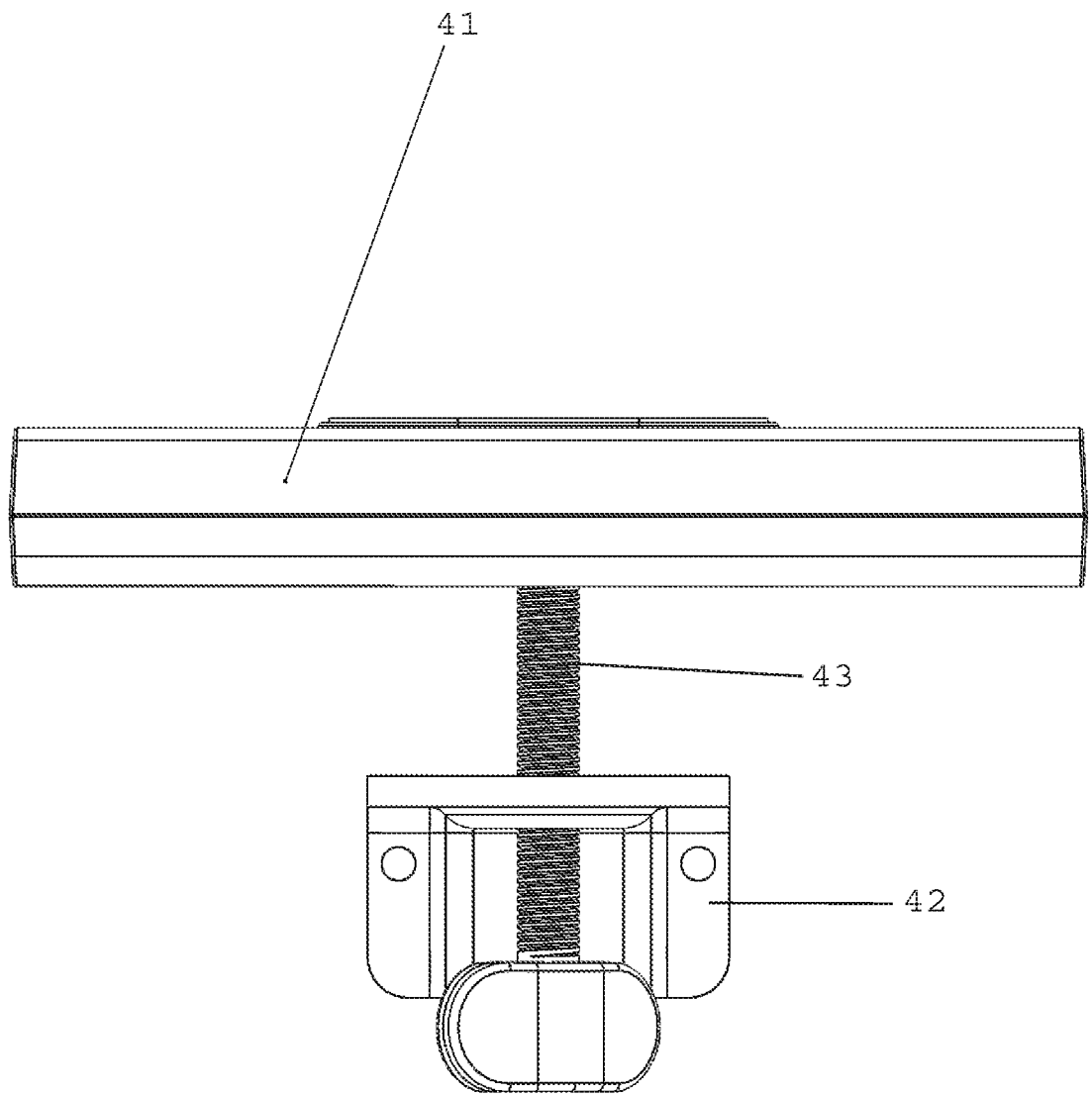
FIG. 16 is a front view of an embodiment of the lower dock subassembly of the computer docking station shown in FIG. 1.

Referring now to FIG. 15, in an exemplary embodiment data port 55 can comprise a DC power connector through which power is supplied to the lower dock subassembly 40. Data port 56 can comprise USB-A 3.0 SS data bridge cable connector capable of being mated to the bridge cable 6 for transferring data between the upper subassembly PCBA 22 of the upper dock subassembly 20 and the lower subassembly PCBA 45 of the lower dock subassembly 40. Alternatively, Data port 56 can comprise a USB-C connector or can be replaced with a wireless communication mechanism. Data port 57 can comprise a USB-A mini 3.0 audio combo bridge cable connector or a USB-C port/connector to allow the transfer of audio data between the upper dock subassembly 20 and the lower dock subassembly 40. Lastly, data port 58 can comprise a DC power bridge cable connector, or alternatively a USB-C connector, for providing power to the upper dock subassembly 20 and attached laptop.

Figure 17:
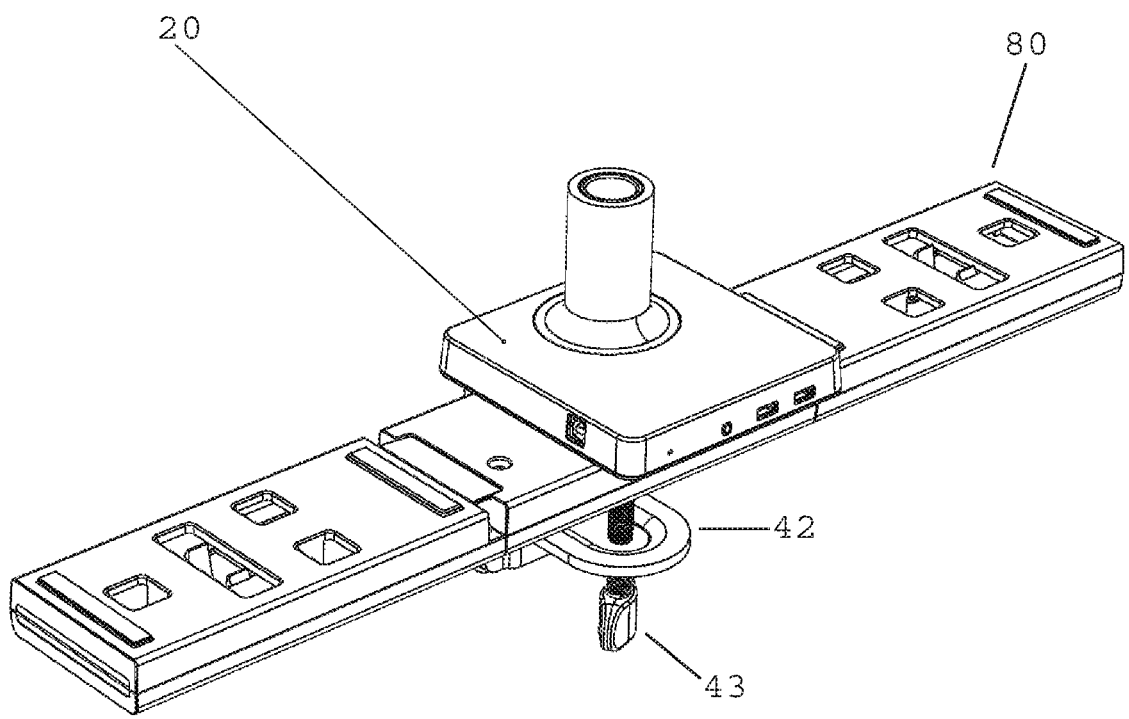
FIG. 17 is a front perspective view of the computer docking station shown in FIG. 1 further comprising an embodiment of a cable management system attached to either side of the lower dock subassembly.
Figure 18:
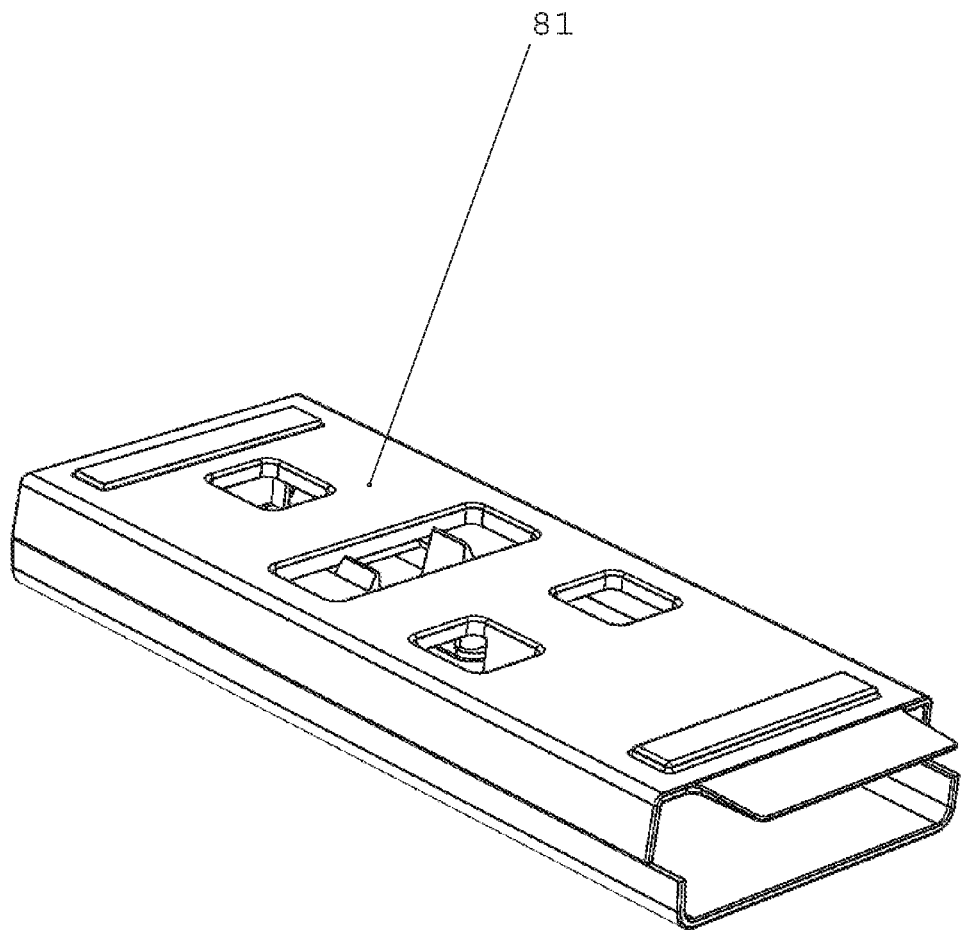
FIG. 18 is a partial rear perspective view of the cable management system shown in FIG. 17.
Figure 19:
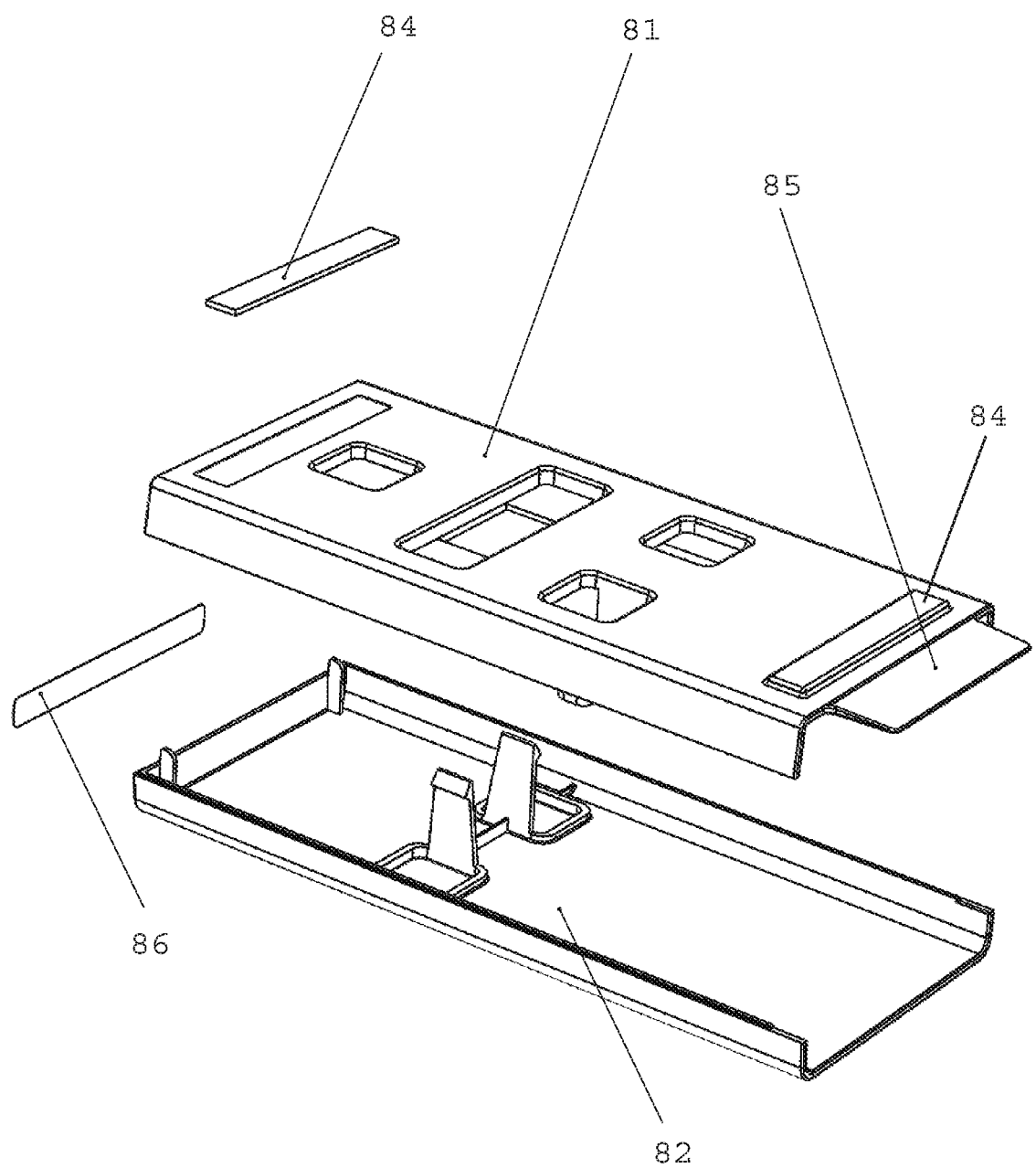
FIG. 19 is an exploded rear perspective view of the cable management system shown in FIG. 18.

Referring now to FIGS. 17-19, the computer docking station 1 can further comprise a cable management enclosure 80 attached to either, or both, sides of the lower dock subassembly 40. The cable management enclosure 80 features an upper cable housing 81 mated with snap joints to a lower lid 82. The upper housing 81 preferably has three internal hooks allowing the user to wrap any cable slack around the hooks for storage within the cable management enclosure 80. Adhesive or mechanical-based fastening strips 84 (e.g., hook and loop fasteners) can be utilized to secure the upper cable housing 81 to the undersurface of the work surface 100. The cable management enclosure 80 may also contain an alignment tab 85 for aligning and securing the cable housing 81 to the housing 41 of the lower dock subassembly 40. A flexible hinge insert 86 can be utilized to releasably connect the lower lid 82 to the cable housing 81 so as to allow a user to access the cable management enclosure 80 by folding down the lower lid 82.

The foregoing description and accompanying drawings illustrate the principles, exemplary embodiments, and modes of operation of the invention. However, the invention should not be construed as being limited to the particular embodiments discussed above. Many modifications of the embodiments described herein will come to mind to one skilled in the art having the benefit of the teaching presented in the foregoing descriptions and the associated drawings. Accordingly, it should be appreciated that variations to those embodiments can be made by those skilled in the art without departing from the scope of the invention.

What is claimed is:

1. A computer docking station comprising:
   a) an upper dock subassembly adapted to be positioned on top of a work surface, the upper dock subassembly comprising a monitor arm mount connected to a data port hub, wherein the data port hub comprises an upper subassembly printed circuit board assembly (PCBA) having one or more active data ports; and
   b) a lower dock subassembly adapted to be positioned beneath the work surface, the lower dock subassembly comprising a housing, wherein the housing comprises a lower subassembly printed circuit board assembly (PCBA) having one or more passive data ports; wherein the one or more active data ports of the upper subassembly PCBA are operatively connected to the one or more passive data ports of the lower subassembly PCBA.

2. The computer docking station of claim 1, wherein the one or more active data ports comprise a first active data port, a second active data port, and a third active data port.

3. The computer docking station of claim 2, wherein the first active data port is selected from a group consisting of an audio port, a USB data port, and a USB charging port.

4. The computer docking station of claim 3, wherein the second active data port is selected from a group consisting of an audio port, a USB data port, and a USB charging port.

5. The computer docking station of claim 4, wherein the third active data port is selected from a group consisting of an audio port, a USB data port, and a USB charging port.

6. The computer docking station of claim 5, wherein the one or more passive data ports comprise a first passive data port, a second passive data port, and a third passive data port.

7. The computer docking station of claim 6, wherein the first passive data port is selected from the group consisting of an Ethernet connector, a display port connector, a HDMI connector, a DVI connector, a USB port, and a DC power connector.

8. The computer docking station of claim 7, wherein the second passive data port is selected from the group consisting of an Ethernet connector, a display port connector, a HDMI connector, a DVI connector, a USB port, and a DC power connector.

9. The computer docking station of claim 8, wherein the third passive data port is selected from the group consisting of an Ethernet connector, a display port connector, a HDMI connector, a DVI connector, a USB port, and a DC power connector.

10. The computer docking station of claim 2, wherein the first active data port is an audio port, the second active data port is a USB data port, and the third active data port is a USB charging port.

11. The computer docking station of claim 6, wherein the first passive data port is an Ethernet connector, the second passive data port is a USB data port, and the third passive data port is a DC power connector.

12. The computer docking station of claim 11, wherein the one or more active data ports further comprise a fourth active data port and a fifth active data port, the fourth active data port and the fifth active data port each being selected from the group consisting of a USB data port and a USB charging port.

13. The computer docking station of claim 12, wherein the one or more passive data ports further comprise a fourth passive data port and a fifth passive data port, the fourth passive data port and the fifth passive data port each being selected from the group consisting of a USB data port, an Ethernet connector, a display port connector, a DVI connector, and a USB charging port.

14. The computer docking station of claim 9, further comprising a cable management enclosure attached to the lower dock subassembly, the cable management enclosure comprising an upper cable housing mated to a lower lid, with the upper cable housing and lower lid each comprising one or more hooks for securing a cable within the cable management enclosure.

15. The computer docking station of claim 1, wherein the monitor arm mount is connected to the data port hub with one or more fasteners.

16. The computer docking station of claim 1, wherein the monitor arm mount is connected to the data port hub by being integrally formed into a top portion of the data port hub.

17. The computer docking station of claim 15, wherein the lower dock subassembly further comprises a screw threadingly engaged with a clamp bracket.

18. The computer docking station of claim 16, wherein the lower dock subassembly further comprises a screw threadingly engaged with a clamp bracket.

19. A computer docking station comprising:
a) an upper dock subassembly adapted to be positioned on top of a work surface, the upper dock subassembly comprising a data port hub having one or more active data ports;
b) a lower dock subassembly adapted to be positioned beneath the work surface, the lower dock subassembly comprising a housing having one or more passive data ports; and
c) a means for operatively connecting the one or more active data ports of the upper dock subassembly to the one or more passive data ports of the lower dock subassembly.

20. A computer docking station comprising:
a) an upper dock subassembly adapted to be positioned on top of a work surface, the upper dock subassembly comprising a monitor arm mount connected to a data port hub, wherein the data port hub comprises one or more active data ports;
b) a lower dock subassembly adapted to be positioned beneath the work surface, the lower dock subassembly comprising a housing, wherein the housing comprises one or more passive data ports; and
c) a means for operatively connecting the one or more active data ports of the upper dock subassembly to the one or more passive data ports of the lower dock subassembly.

21. The computer docking station of claim 20, wherein the one or more active data ports comprise a first active data port, a second active data port, and a third active data port.

22. The computer docking station of claim 21, wherein the first active data port, the second active data port, and the third active data port are each selected from a group consisting of an audio port, a USB data port, and a USB charging port.

23. The computer docking station of claim 22, wherein the one or more passive data ports comprise a first passive data port, a second passive data port, and a third passive data port.

24. The computer docking station of claim 23, wherein the first passive data port, the second passive data port, and the third passive data port are each selected from the group consisting of an Ethernet connector, a display port connector, an HDMI connector, a DVI connector, a USB port, and a DC power connector.

25. The computer docking station of claim 21, wherein the first active data port is an audio port, the second active data port is a USB data port, and the third active data port is a USB charging port.

26. The computer docking station of claim 23, wherein the first passive data port is an Ethernet connector, the second passive data port is a USB data port, and the third passive data port is a DC power connector.

27. The computer docking station of claim 20, wherein the monitor arm mount is connected to the data port hub with one or more fasteners.

28. The computer docking station of claim 20, wherein the monitor arm mount is connected to the data port hub by being integrally formed into a top portion of the data port hub.

* * * * *